US010904677B2

(12) United States Patent
Westermann et al.

(10) Patent No.: US 10,904,677 B2
(45) Date of Patent: *Jan. 26, 2021

(54) SYSTEM AND METHOD FOR MANAGING A CUSTOMIZABLE CONFIGURATION IN A HEARING AID

(71) Applicant: WIDEX A/S, Lynge (DK)

(72) Inventors: Soren Erik Westermann, Espergaerde (DK); Svend Vitting Andersen, Espergaerde (DK); Anders Westergaard, Herlev (DK); Niels Erik Boelskift Maretti, Birkerod (DK)

(73) Assignee: WIDEX A/S, Lynge (DK)

( * ) Notice: Subject to any disclaimer, the term of this patent is extended or adjusted under 35 U.S.C. 154(b) by 0 days.

This patent is subject to a terminal disclaimer.

(21) Appl. No.: 15/964,582

(22) Filed: Apr. 27, 2018

(65) Prior Publication Data

US 2018/0249259 A1 Aug. 30, 2018

Related U.S. Application Data

(63) Continuation of application No. PCT/EP2015/075110, filed on Oct. 29, 2015.

(51) Int. Cl.
*H04R 25/00* (2006.01)
*H04L 29/08* (2006.01)

(52) U.S. Cl.
CPC ......... *H04R 25/505* (2013.01); *H04L 67/025* (2013.01); *H04L 67/12* (2013.01);
(Continued)

(58) Field of Classification Search
CPC .. H04R 25/505; H04R 25/554; H04R 25/558; H04R 25/70; H04R 2225/55;
(Continued)

(56) References Cited

U.S. PATENT DOCUMENTS 5,303,306 A 4/1994 Brillhart et al.
5,500,902 A 3/1996 Stockham, Jr. et al.
(Continued)

FOREIGN PATENT DOCUMENTS

EP 1 473 969 A2 11/2004
EP 2 103 180 A2 9/2009
(Continued)

OTHER PUBLICATIONS

Ying Wei et al., "A Reconfigurable Digital Filterbank for Hearing-Aid Systems With a Variety of Sound Wave Decomposition Plans", IEEE Transactions on Biomedical Engineering, Jun. 2013, pp. 1628-1635, vol. 60, No. 6.
(Continued)

*Primary Examiner* — Jesse A Elbin
(74) *Attorney, Agent, or Firm* — Sughrue Mion, PLLC

(57) ABSTRACT

A hearing aid configuration managing system for configuring at least one hearing aid having a wireless connection to the Internet via a gateway. The hearing aid includes a processor controlling its configuration, and a memory containing configuration settings for customizing the configuration of the hearing aid. The remote server manages user accounts for multiple hearing aid users, including managing the configuration of the hearing aid, and creates a service level status change event for the account upon change of the service level status to a new configuration of the hearing aid. The remote server sends a configuration change instruction to the hearing aid via the gateway upon the occurrence of the service level status change event. The hearing aid processor stores new configuration settings in the hearing aid memory upon reception of the configuration change instruction, and changes the hearing aid to the new configuration.

21 Claims, 5 Drawing Sheets

(52) U.S. Cl.
CPC .......... *H04L 67/125* (2013.01); *H04L 67/306* (2013.01); *H04L 67/34* (2013.01); *H04R 25/554* (2013.01); *H04R 25/70* (2013.01); *H04L 67/04* (2013.01); *H04R 2225/55* (2013.01)

(58) Field of Classification Search
CPC ....... H04L 67/025; H04L 67/04; H04L 67/12; H04L 67/125; H04L 67/306; H04L 67/34
USPC ................................................ 381/315, 320
See application file for complete search history.

(56) References Cited

U.S. PATENT DOCUMENTS

| | | | |
|---|---|---|---|
| 6,115,478 A | 9/2000 | Schneider | |
| 6,240,192 B1 * | 5/2001 | Brennan | H04R 25/505 381/312 |
| 6,658,307 B1 | 12/2003 | Mueller | |
| 6,741,712 B2 * | 5/2004 | Bisgaard | H04R 25/505 381/312 |
| 7,024,000 B1 | 4/2006 | Gabara et al. | |
| 7,200,237 B2 | 4/2007 | Zhang et al. | |
| 8,085,960 B2 * | 12/2011 | Alfsmann | H04R 25/50 381/320 |
| 8,189,830 B2 | 5/2012 | Hou | |
| 8,289,990 B2 | 10/2012 | Mitchler | |
| 8,767,986 B1 * | 7/2014 | Fabry | H04R 25/70 381/314 |
| 10,187,733 B2 * | 1/2019 | Schneider | H04R 25/558 |
| 2002/0054689 A1 | 5/2002 | Zhang et al. | |
| 2010/0067711 A1 | 3/2010 | Waldmann | |
| 2010/0076793 A1 * | 3/2010 | Goldstein | G06F 21/10 705/4 |
| 2012/0051569 A1 * | 3/2012 | Blamey | H04R 25/70 381/314 |
| 2013/0110897 A1 | 5/2013 | Nam et al. | |
| 2013/0177189 A1 | 7/2013 | Bryant et al. | |
| 2015/0023512 A1 * | 1/2015 | Shennib | H04R 25/70 381/60 |
| 2016/0134742 A1 * | 5/2016 | Shennib | H04M 1/72533 455/420 |

FOREIGN PATENT DOCUMENTS

| | | |
|---|---|---|
| EP | 2 437 394 A1 | 4/2012 |
| JP | 2015-501114 A | 1/2015 |
| WO | 01/54458 A2 | 7/2001 |
| WO | 2013/091702 A1 | 6/2013 |
| WO | 2014/094859 A1 | 6/2014 |
| WO | 2016/078709 A1 | 5/2016 |

OTHER PUBLICATIONS

Written Opinion for PCT/EP2015/075110, dated Aug. 19, 2016.
International Search Report for PCT/EP2015/075110, dated Aug. 19, 2016.
Communication dated Apr. 17, 2019, from the European Patent Office in counterpart European Application No. 15786980.1.
Notification of Reasons for Refusal dated Jun. 25, 2019, issued by the Japan Patent Office in corresponding application No. 2018-540205.

* cited by examiner

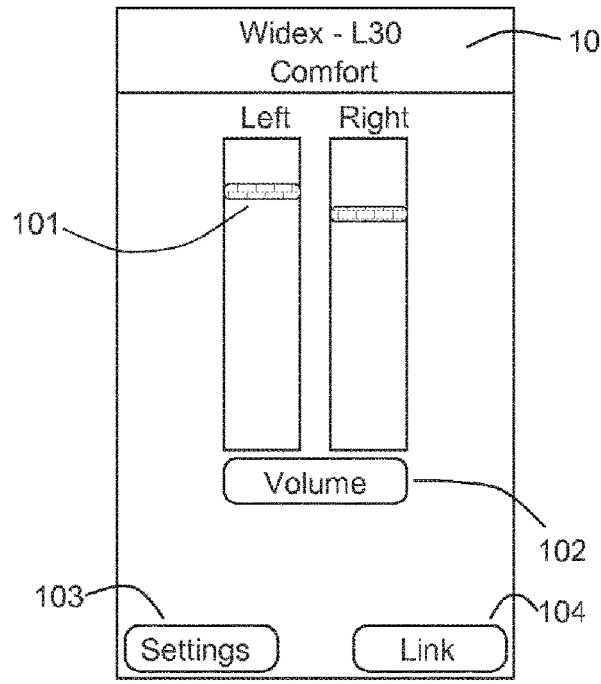
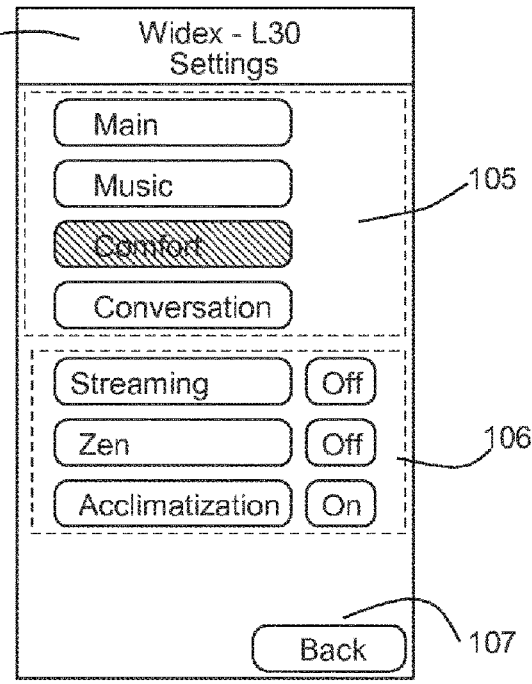
*Fig. 4a*   *Fig. 4b*
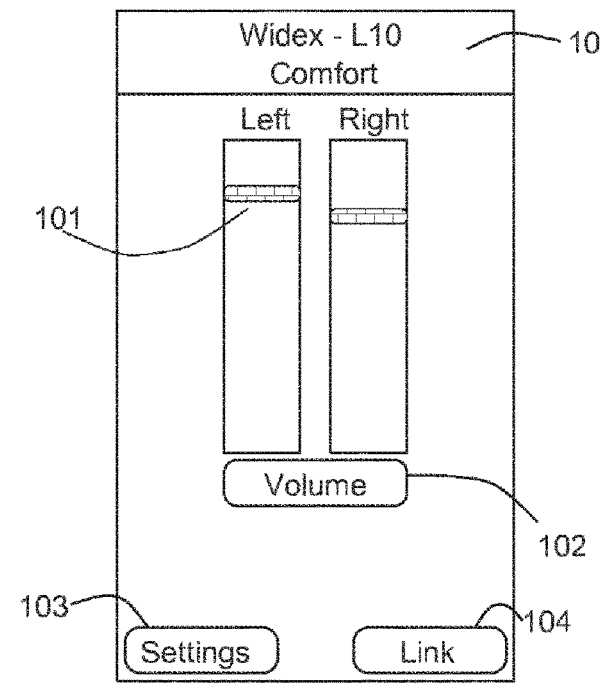
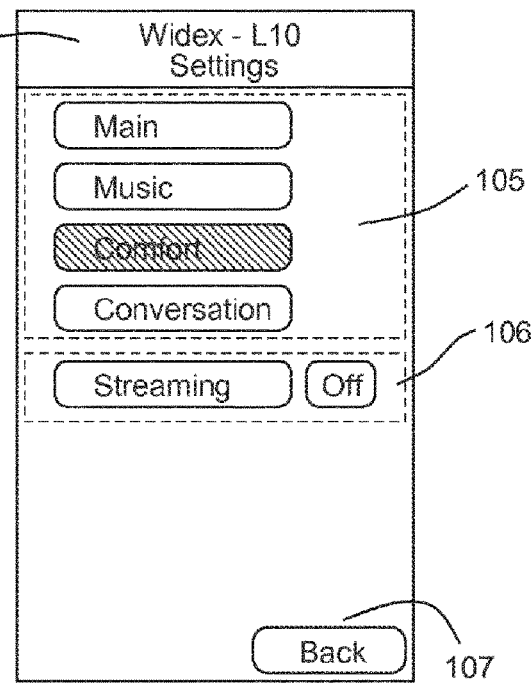
*Fig. 4c*   *Fig. 4d*

SYSTEM AND METHOD FOR MANAGING A CUSTOMIZABLE CONFIGURATION IN A HEARING AID

TECHNICAL FIELD

The present invention relates to hearing aids. The invention, more particularly, relates to a method for managing a customizable configuration in a hearing aid. The invention also relates to a system managing a customizable configuration in a hearing aid via the Internet.

BACKGROUND OF THE INVENTION

A hearing aid is an electro-acoustic device typically worn in or behind the ear and being designed to amplify sound for the wearer, usually with the aim of making speech more intelligible, and to correct impaired hearing as measured by audiometry. Some hearing aid manufacturers has created new business models enabling the distributor to configure a product meeting local market demands by providing the distributor with the possibility to enable and/or disable features when programming the hearing aid.

Recently, hearing aids with wireless connectivity based on an open telecom protocol have reached the market. Binaural hearing aids based on proprietary communication protocols have been on the market for a decade. The Bluetooth connectivity is the most recent innovation in wireless interfacing for hearing instruments to audio sources such as TV streamers or mobile phones. Even though this is a major achievement, the customization of the hearing aids is still provided by the hearing healthcare professional providing a hearing aid with the configuration he recommends for the user, adding one or more programs for the user and setting acclimatization when introducing a new hearing system. This means that the user has to take a lot of important decisions about the configuration of a new hearing aid during the consultation with the hearing healthcare professional. The decision about the configuration is a decision about the hearing aid model, and such a decision has a huge impact on the overall price of the hearing aid.

SUMMARY OF THE INVENTION

The purpose of the invention is to provide a hearing aid service system managing a customizable configuration in a hearing aid.

This purpose may according to the invention be achieved by a hearing aid configuration managing system for configuring at least one hearing aid having a wireless connection to the Internet via a gateway. The at least one hearing aid includes a processor controlling the configuration of the hearing aid, and a memory containing configuration settings for customizing the configuration of the at least one hearing aid. A remote server is adapted for managing user accounts for a plurality of hearing aid users, including managing the configuration of the at least one hearing aid. The remote server is adapted for creating a service level status change event for the account upon change of the service level status to a new configuration of the at least one hearing aid. The remote server is adapted for sending a configuration change instruction to the at least one hearing aid via the gateway upon the occurrence of the service level status change event. The hearing aid processor is adapted for storing new configuration settings in the hearing aid memory, and changes the configuration of the hearing aid to the new configuration upon reception of the configuration change instruction.

Upon reception of a hearing aid user generated order to customize the configuration of the at least one hearing aid, the remote server is preferably adapted to invoice the hearing aid user for the order based upon invoicing information stored in the account.

Preferably, the personal communication device is a smartphone being adapted to present a hearing aid control application software interface to the user. Upon reception of the order to customize the configuration of the at least one hearing aid, the remote server is preferably adapted to update the control elements of the hearing aid control application software interface.

The service level change preferably upgrades a basic service level to an enhanced service level available for a subscription period managed via the account on the remote server. Upon expiration of the subscription period, the remote server preferably automatically creates a service level status change event for changing the customized configuration of the at least one hearing aid back to the configuration associated with the basic service level, and sends a configuration change instruction to the at least one hearing aid by using the personal communication device as gateway.

According to a second aspect of the invention there is provided a hearing aid comprising a transceiver for establishing a wireless connection via a gateway to a remote server accessible over the Internet, a processor controlling the configuration of the hearing aid, and a memory containing configuration settings for customizing the configuration of the at least one hearing aid. The hearing aid processor is adapted to receive a configuration change instruction sent from a remote server via the gateway, extract new configuration settings from the configuration change instruction, store the new configuration settings in the hearing aid memory, and modify the configuration of the hearing aid according to new configuration settings.

According to a third aspect of the invention there is provided a method for configuring at least one hearing aid having a wireless connection to the Internet via a gateway. The hearing aid includes a processor controlling the configuration of the hearing aid, and a memory containing configuration settings for customizing the configuration of the hearing aid. The remote server manages user accounts for a plurality of hearing aid users. The method comprises the steps of managing a subscription status for the configuration of the at least one hearing aid, creating a service level status change event for the account upon change of the service level status to a new configuration of the at least one hearing aid, sending a configuration change instruction from the remote server via the gateway to the hearing aid upon the occurrence of the service level status change, and storing new configuration settings in the hearing aid memory upon reception of the configuration change instruction, and changing the configuration of the hearing aid to the new configuration.

According to a fourth aspect of the invention there is provided a computer-readable storage medium having computer-executable instructions, which, when executed in an Internet enabled personal communication device acting as a gateway between at least one hearing aid and a remote server accessible over the Internet, are adapted for presenting a hearing aid control application software interface to the hearing aid user on the personal communication device, updating the control elements of the hearing aid control application software interface on the personal communication device, upon reception of the order to customize the configuration of the at least one hearing aid.

According to a fifth aspect of the invention there is provided an Internet enabled personal communication device for establishing a wireless connection to at least one hearing aid, and thereby becoming a gateway for the at least one hearing aid to a remote server accessible over the Internet. The personal communication device is adapted for presenting a hearing aid control application software interface to the hearing aid user on the personal communication device, and updating the hearing aid control application software interface with additional control elements on the personal communication device, upon reception of the order to customize the configuration of the at least one hearing aid.

According to a sixth aspect of the invention there is provided a server adapted to communicate with the at least one hearing aid via the Internet using a personal communication device as gateway. The server is managing user accounts for a plurality of hearing aid users, including managing the configuration of the at least one hearing aid. The server creates a service level status change event for the account upon receiving change request from the hearing aid user for a new configuration of the at least one hearing aid, and sends a configuration change instruction to the at least one hearing aid by using the personal communication device as gateway upon the occurrence of the service level status change event.

BRIEF DESCRIPTION OF DRAWINGS

The invention will be described in further detail with reference to preferred aspects and the accompanying drawing, in which:

FIGS. 4a-4d illustrates the hearing aid control application software interface according to a second of the invention;

DETAILED DESCRIPTION OF THE INVENTION

Figure 1:
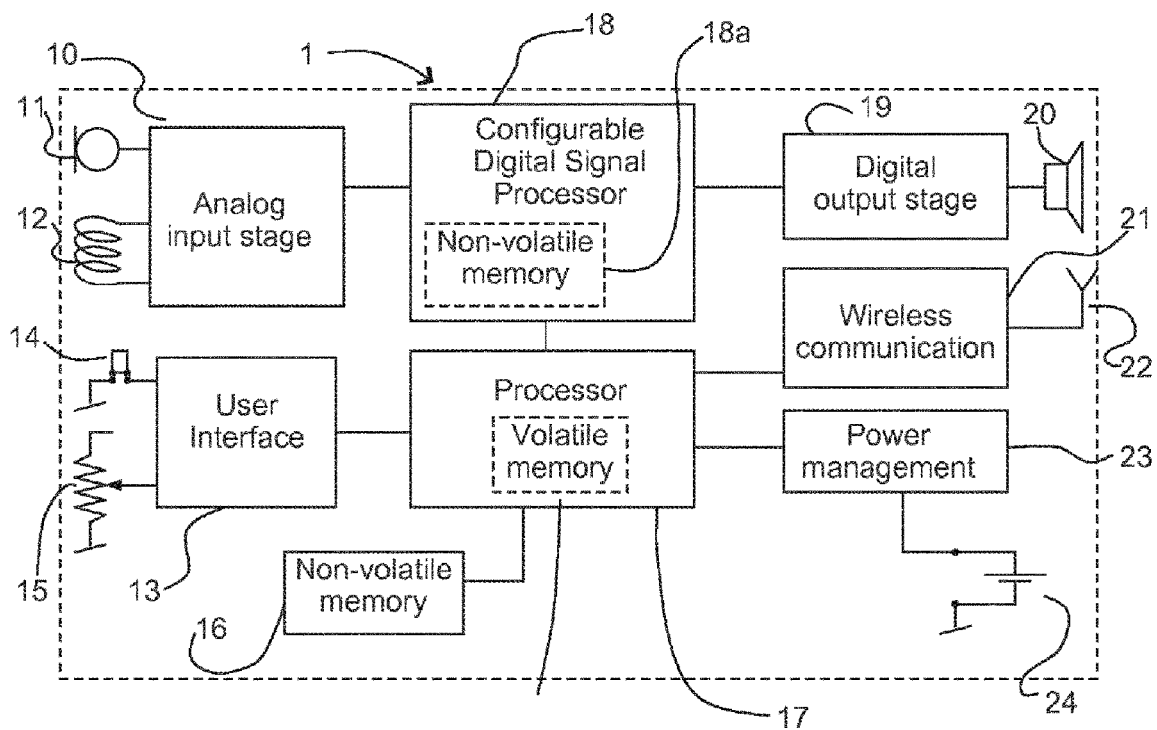
FIG. 1 illustrates schematically a hearing aid according to one aspect of the invention.

Reference is made to FIG. 1, which schematically illustrates a hearing aid 1 for use in a hearing aid service system according to an aspect of the invention. The hearing aid 1 comprises at least one input transducer 11 for picking up the acoustic sound and converting it into electric signals. Furthermore, the hearing aid 1 has a telecoil 12 for detecting an electric signal e.g. generated by an audio induction loop (not shown) integrated in a telephone, an FM system (with neck loop), or an induction loop system that transmits sound to hearing aids from e.g. public address systems or televisions.

The electric signal from the transducer 11 or the telecoil 12 is pre-amplified and analog-to digital converted in an analog input stage 10. The digital signal from the analog input stage 10 is fed to a configurable Digital Signal Processor 18 delivering a processed signal conditioned according to a predetermined setting, e.g. set by an audiologist. The conditioned signal from the configurable Digital Signal Processor 18 is via a digital output stage 19 amplifying the conditioned signal output to a speaker or output transducer 20. The digital output stage 19 may advantageously include a Delta-Sigma-converter providing an electrical output signal formed as a one-bit digital data stream fed directly to an output transducer 20, i.e. the output converter drives the transducer 20 directly as a class D amplifier.

The configurable Digital Signal Processor 18 (DSP) is a specialized microprocessor with its architecture optimized for the operational needs of the digital signal processing task—the amplification and conditioning is carried out according to a predetermined setting in order to alleviate a hearing loss by amplifying sound at frequencies in those parts of the audible frequency range where the user suffers a hearing deficit.

Digital signal processing is numerical manipulation of signals, including measuring, filtering, producing or compressing. Digital signal processing is operating on digital signals that map the analog signals as discrete signal values in the time or frequency domain.

The configurable Digital Signal Processor 18 includes an inherent non-volatile memory 18a which retains stored information even when not powered. The predetermined setting in order to alleviate a hearing loss is stored in the non-volatile memory 18a.

A wireless communication unit 21 includes an antenna 22 for communication with other devices via a short range communication link. Such a short range communication link may be provided by Bluetooth™ Low Energy which is a wireless technology standard for exchanging data over short distances (typically less than 10 m), operating in the same spectrum range (2402-2480 MHz) as Classic Bluetooth technology. However other standards—like WLAN or proprietary standards—may be applicable if a wide availability and low power consumption is present. A Bluetooth Core System consists of an RF transceiver, baseband (after down conversion), and protocol stack (SW embedded in a dedicated Bluetooth™ Integrated Circuit. The system offers services that enable the connection of devices and the exchange of a variety of classes of data between these devices.

The wireless communication unit 21 has a digital interface towards the processor 17, and delivers digital signals to the processor 17 based upon the radio signal received by the antenna 22, and these digital signals include an indication of the type of data and the actual payload. The payload may be control signals controlling the operation of the hearing aid, and audio data representing audio streamed to the hearing from a remote device like a smartphone paired with hearing aid 1, a smart television or another device having audio streaming capabilities matching the wireless communication interface of the hearing aid 1. The payload may also be audio signals or control signals from a similar hearing aid 1 in a pair of binaural hearing aids.

The hearing aid 1 includes a standard hearing aid battery 24 and a power management unit 23 ensuring that the various components are powered by predetermined stable voltages regardless of the momentary voltage value of the battery 24.

The hearing aid 1 has a processor 17 being a processing and control unit carrying out instructions of a computer program by performing the logical, basic arithmetic, control and input/output (I/O) operations specified by the instruction in the computer programs. The processor 17 includes an inherent volatile memory 17a requiring power to maintain the stored information. The content of the volatile memory 17a is erased every time the hearing aid 1 is switched off. Examples of volatile memory are various types of RAM.

The processor 17 is further connected to a non-volatile memory 16 which retains stored information even when not powered. Examples of non-volatile memories are flash memory, EPROM or EEPROM memory used for firmware such as boot programs.

The hearing aid 1 has a user interface unit 13 including a push button 14—e.g. for toggling between the hearing aid programs—and a potentiometer 15 for volume control. The user interface unit 13 transfers the input to the processor 17 storing the user input in the volatile memory 17a for controlling the hearing aid 1.

A configuration file contains instructions to configure the hearing aid 1, and the configuration file is stored in the non-volatile memory 16, from where the processor 17 retrieves configuration data when starting up or booting. Preferably, the configuration file is line-oriented, with lines terminated by a newline or a similar break. The configuration file contains a setting for configuring the hearing aid 1—including the configurable Digital Signal Processor 18.

The configuration of a hearing aid is an arrangement of functional units according to their nature, number, and characteristics. The configuration pertains to the choice of hardware—filter bank configuration, activation of element embedded into the Digital Signal Processor, activation of sensor elements and additional microphones. The configuration affects the hearing aids function and performance.

Figure 2:
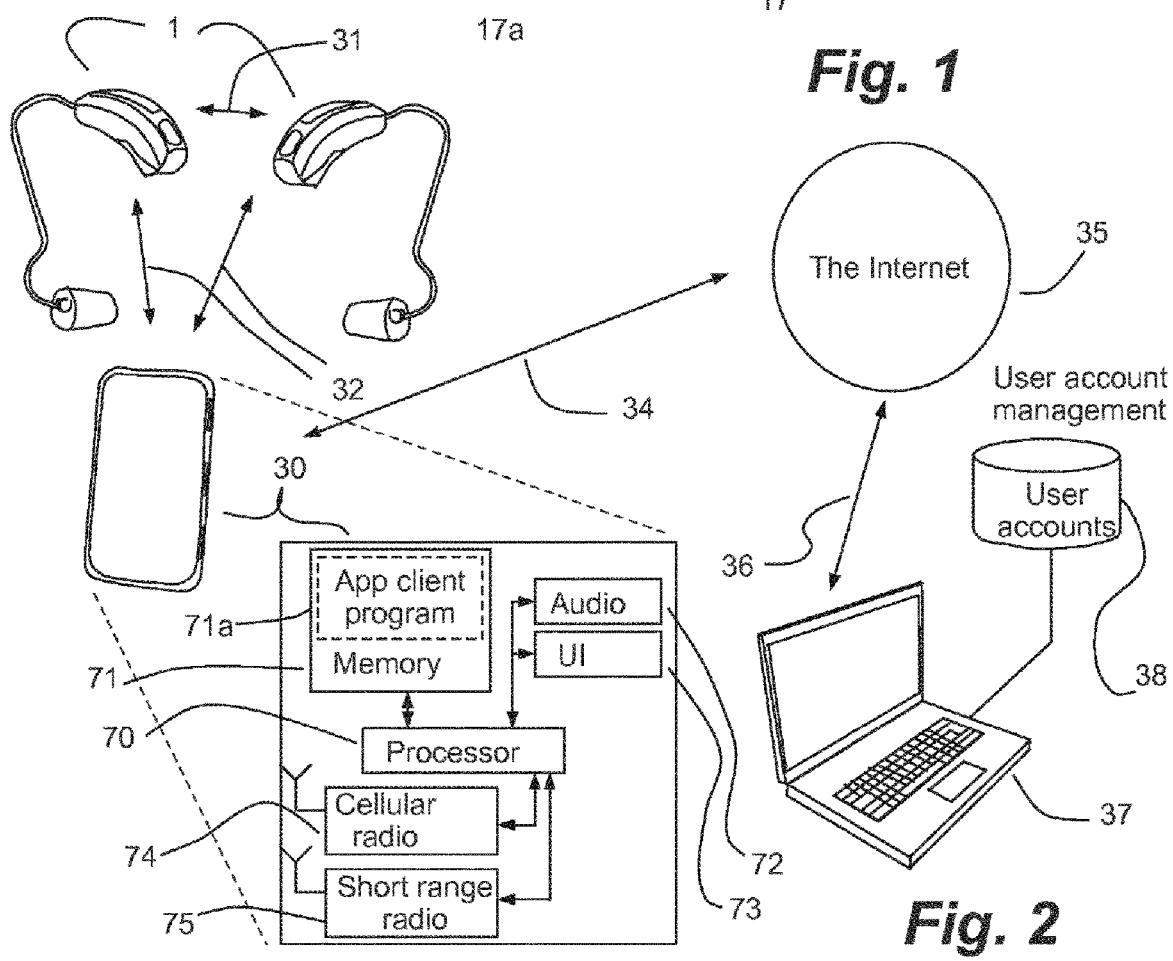
FIG. 2 illustrates schematically a hearing aid configuration management system according to a first embodiment of the invention.

FIG. 2 illustrates schematically a hearing aid configuration management system according to a first embodiment of the invention. A hearing aid user has a set of binaural hearing aids 1 and a personal communication device 30. The user pairs the set of binaural hearing aids 1 and the personal communication device 30, the pairing procedure according to Bluetooth™ Low Energy protocol being well known. The inter-ear communication 31 between the pair of hearing aids 1 is bi-directional and includes transfer of audio and control signals. The communication 32 between one of the hearing aids 1 the personal communication device 30 is bi-directional and includes transfer of audio and control signals.

However, the user may advantageously choose to use special hearing aid software running on the personal communication device 30 adapted to control the pairing, and this software may either be embedded in the personal communication device 30 from the factory or be downloaded to the personal communication device 30 from an app store, which is access via a WLAN or cellular connection 34 to the Internet 35. The software app includes information about how to access (including the Internet address) a user account management server 37. The user account management server 37 is connected to the Internet 35, preferably via a wired connection 36, and has a data storage 38 in which the user account database is stored.

The personal communication device 30 is preferred for proving the gateway for the hearing aids 1 to the Internet, but the invention may be seen in an embodiment where the hearing aid 1 are connected directly to a router via a WLAN standard or to another appropriate device including the hearing aids 1 in the Internet of Things (IoT).

Preferably, the hearing aids 1 are programmed to automatically upload identification details for the hearing aid 1 to the user account management server 37 when the hearing aids 1 has been paired with the personal communication device 30, and thereby linked to a user account 50 by means of the gateway formed by the personal communication device 30. These product ID data are read from the product ID string in the hearing aid memory 18a and uploaded via the gateway and the Internet to the user account management server 37 and into data field 57 of the user account 50. The data stored in the Hearing Aid model data field 57 may include ID information, such as serial number, software version and information about special hardware.

Preferably, the pairing is done by bringing the personal communication device 30 via the launched application software into a searching mode, in which the personal communication device 30 searches for hearing aids 1 in pairing mode. Preferably a hearing aid 1 is brought into pairing mode for a period of time by switching the hearing aid 1 on. The personal communication device 30 may list the hearing aids 1 identified in pairing mode. Then the pairing preferably takes place by requesting the hearing aid 1 to communicate a pairing code in an auditory communication, e.g. as an audio message, to the hearing aid user, and when the user has successfully entered the pairing code via a graphical user interface on the personal communication device 30, the pairing mode has been successfully completed. If the set of hearing aids 1 includes a second one, the pairing step is repeated for this one, too. Preferably, the hearing aids 1 provide an audio indication to the user when a hearing aid enters the pairing mode, and preferably also when the pairing mode has been successfully completed.

Upon setting up a wireless connection between at least one hearing aid 1 and the personal communication device 30 under guidance of application software, the user account management server 37 identifies in the user account 50 the personal communication device 30 as a gateway for the hearing aid 1 to the Internet 35. So far only the set of hearing aids 1 and the personal communication device 30 are identified in an anonymous user account.

Figure 3:
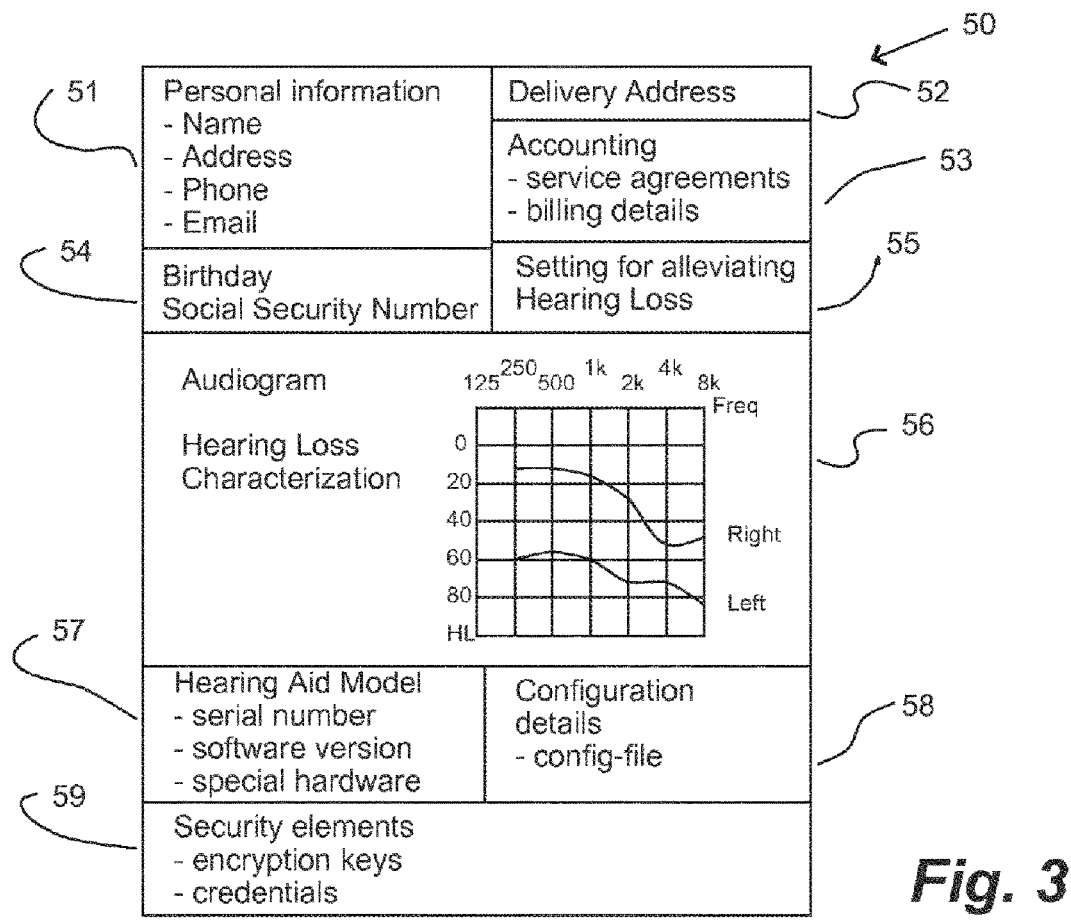
FIG. 3 illustrates schematically the data structure of a user account handled in the data management system according to an embodiment of the invention.

However, when the user creates a user account 50 on the user account management server 37 accessible over the Internet from the Internet enabled computer device, e.g. a laptop, tablet PC or a smartphone, the user enters a URL—preferably provided on the hearing aid sales package—into an appropriate browser window in order to create the account at the service provider. In the web page opened, the user may create a new account and enter appropriate personal information. The user accounts 50 are stored in a database at the user account management server 37. The kind of personal information included in the user account 50 will later on be explained with reference to FIG. 3. As a part of the account set up, the user is invited to set up credentials for the account, and these credentials may in one embodiment include a username and a password—both specified by the user. Now the account has been created, the user is allowed to log off, and later on log on again for complementing the account with additional data. During the account setup, in step 48, the user is invited to identify a gateway to his hearing aids 1. The personal communication device 30 serves this purpose, and the user may identify the personal communication device 30 by means of e.g. its phone number or IP-address.

Once the personal communication device 30 has been identified as a gateway, the user account management server 37 contacts the personal communication device 30 in order to verify its role as a gateway. This contact may preferably be done via the software app running on the personal communication device 30, and when the user has verified the gateway data, the personal communication device 30 starts to upload data about the hearing aids 1.

Hereafter the user account management server 37, when the hearing aids 1 are online, will via the personal communication device 30 compare the settings for alleviating the hearing loss stored in the hearing aids 1 and in the data fields of the user account 50, and keep these settings synchronized. Hereby these data will be kept updated no matter whether the hearing aids 1 have been updated in an off-line fitting process, or whether a new fine-tuning has been performed orchestrated by the user account management server 37. The user is allowed to log off, and later on log on again for editing existing data in the account or for adding further data.

The data set in a user account 50 includes a personal information data field 51, which typically is the first data field filled out by the user when creating an account. The personal information includes name, address and additional contact data like phone number and e-mail address. A delivery address data field 52 defines the delivery address for physical products to be delivered to the hearing aid user. The delivery address is specified by the owner of the account and may be identical to the home address identified in the personal information data field 51 or may identify a preferred supermarket or retail store in case the account is linked to a membership in a warehouse club.

In an accounting data field 53, a service provider or any authorized hearing aid professional may enter respective service agreements and the user may enter invoicing details, such as that an invoice is preferred or that an amount to be drawn from a specified credit card is preferred. The service agreements may refer to a specified fitting session, a hearing test, purchase of a specified set of hearing aids, subscription to a specified set of hearing aids, upgrade of an existing set of hearing aids, batteries, or replacement parts. The user has the right to approve the service agreements and enter invoicing details, while the service providers may enter service agreement details as price and conditions supported by one or more documents and use entered invoicing details for their own accounting. The accounting data field 53 will only contain one service agreement, and if several service agreements are initiated, supplementing accounting data fields 53 will be created. Only parties to a service agreement do have Data Retrieval Rights to these data fields 53.

In a social security data field 54, the user may enter his birthday information and social security number, which may be used by the social authorities in cases these are committed to pay a part of the sales prize or subscription fees.

When the authorized hearing healthcare professionals or audiologist tests the hearing of a client, he obtains the results in an audiogram, which is a graph showing the hearing loss measured in decibels for standardized frequencies in Hertz. The threshold of hearing is plotted relative to a standardized curve that represents "normal" hearing, in dB (HL). According to the invention the authorized hearing aid professional may store the hearing loss characterization in a dedicated Hearing Loss Characterization data field 56, whereby the authorized hearing aid professional or another authorized hearing aid professional on a later point of time may assess changes in the hearing capability of the client.

When the authorized hearing aid professional has determined the hearing loss of his client and an appropriate hearing aid has been chosen, the authorized hearing aid professional sets the hearing aid compensation profile parameters (fitting) in an interactive dialogue with the client. Once the fitting has been completed, the settings are stored in the hearing aid memory 18a. Once the settings have been updated in the hearing aid 1, and the hearing aid 1 has identified a gateway to the Internet 35 via the personal communication device 30, the hearing aid compensation profile parameters are transferred to the user account management server 37 and stored in the appropriate user account 50 in a data field 55 containing the settings for alleviating Hearing Loss. Preferably, the data field 55 includes historical data for the hearing compensation profile settings. Hereby the user may request a previous setting if he for some reasons finds the current setting problematic in a specific sound environment or situation—this opens for "undo" functionality.

For each user account 50 there is provided a data field 59 containing security elements as credentials for accessing to one or more data fields in the hearing aid user account 50 and secure keys for establishing a secure connection between the user account management server 37 and the hearing aids 1. The hearing user may by means of the stored security elements edit credentials via a web-interface. The user account manager may by means of certificates control persons allowed to Read and Edit data in the user account and thereby in the hearing aid 1 and the hearing user may delegate these rights to third parties.

Finally the hearing aid account 50 includes data field 58 in which configuration details for the at least one hearing aid 1 are associated with the user account 50. These configuration details may include a configuration file for each hearing aid 1, where the configuration file controls the configuration, the performance and/or the interconnection of various hardware items in the signal processing path of the hearing aid 1. A configuration is an arrangement of functional units according to their nature, number, and primary characteristics. The configuration affects system function and performance.

The configuration file configures the various hardware items in the signal processing path of the hearing aid 1 during start up or booting. The configuration file is line-oriented.

The invention also relates to an Internet enabled personal communication device 30 for establishing a wireless connection to at least one hearing aid 1, and thereby becoming a gateway for the at least one hearing aid 1 to a user account management server 37 accessible over the Internet 35. The personal communication device 30 is, according one embodiment shown schematically in details in FIG. 2, a smartphone. The personal communication device 30 includes a processor 70 controlling the operation of audio elements 72 (like a speaker and a microphone), UI elements 73 (like a touch screen or keys and a display). Furthermore the processor 70 controls the operation of a long range radio 74 serving various mobile communication standards and WLAN standards connecting the personal communication device 30 to the internet 35. A short range radio 75 connects the personal communication device 30 to the hearing aid 1 by means of the Bluetooth Low Energy protocol. The personal communication device 30 has memory 71 (e.g. EEPROM)—containing a hearing aid control app 71a.

The personal communication device 30 is adapted to present the hearing aid control app 71a to the hearing aid user on a touch screen of the personal communication device 30. The hearing aid control app 71a is adapted to offer control elements for the operation of the hearing aid, and if the hearing aid 1 has been reconfigured according to the invention, and if this reconfiguration of the hearing aid 1 offers a different amount of opportunities when using the hearing aid 1, the user account management server 37 pushes an update of the app with updated hearing aid control application software interface as a part of the order to customize the configuration of the hearing aid 1.

FIG. 4 shows an embodiment for the hearing aid control application software interface used in the Internet enabled personal communication device 30 according to the invention. The Internet enabled personal communication device 30 may advantageously be a smartphone and the app 71a is downloaded as computer-executable instructions from an app store. The hearing aid control application software is illustrated in four schematic screenshots shown in FIGS. 4a-4d for a touch screen display. The first screenshot shown in FIG. 4a illustrates a so-called entry screen which is entered when the app is opened. As seen here, the entry screen comprises a header 100 indicating the model name or the configuration, "Widex L30", of the connected hearing aid 1, and the current sound environment program "Comfort"—either selected manually or automatically. Below the header 100, there is provided a control area 101 for setting the sound volume, and an indication area 102 indicating the parameter controlled by the control area 101. The user may e.g. enter a "setting" screen shown in FIG. 4b from the entry screen by swiping his thumb across the display from left to right or by touching a "Setting" control area 103. A "Link" control area 104 allows the user to link the hearing aid 1 and smartphone 30 to further selectable audio streaming sources.

The "setting" screen shown in FIG. 4b still comprises the header 100 indicating the model name or the configuration, "Widex L30", and that the user has accessed the setting screen. The "setting" screen has three elements—a sound environment program selection element 104 having four selectable controls with the currently active sound environment program highlighted; a comfort program selection element 105 having three selectable controls including an on/off indication; and a "back" control that will bring the app back to the entry screen.

The screen shoots 4c and 4d are identical to the screen shots 4a and 4b—apart from the hearing aid 1 having been reconfigured—e.g. from twelve to four processing bands—and the header 100 now indicates the model name or the configuration, "Widex L10". When entering the "setting" screen shown in FIG. 4d, the header 100 now indicates the model name or the configuration, "Widex L10". The "setting" screen still has three elements—the sound environment program selection element 104; the comfort program selection element 105; and the "back" control. Due to the change of the hearing aid configuration—either due to technical limitations or due to limitations caused by the price point segmentation from the manufacturer, some of the program opportunities in the sound environment program selection element 104 and/or the comfort program selection element 105 may be disabled and therefore no longer visible for the hearing aid user. A tinnitus alleviation program, "Zen", and an "acclimatization" program is available for the "L30" configuration but not for the "L10" configuration.

Figure 5:
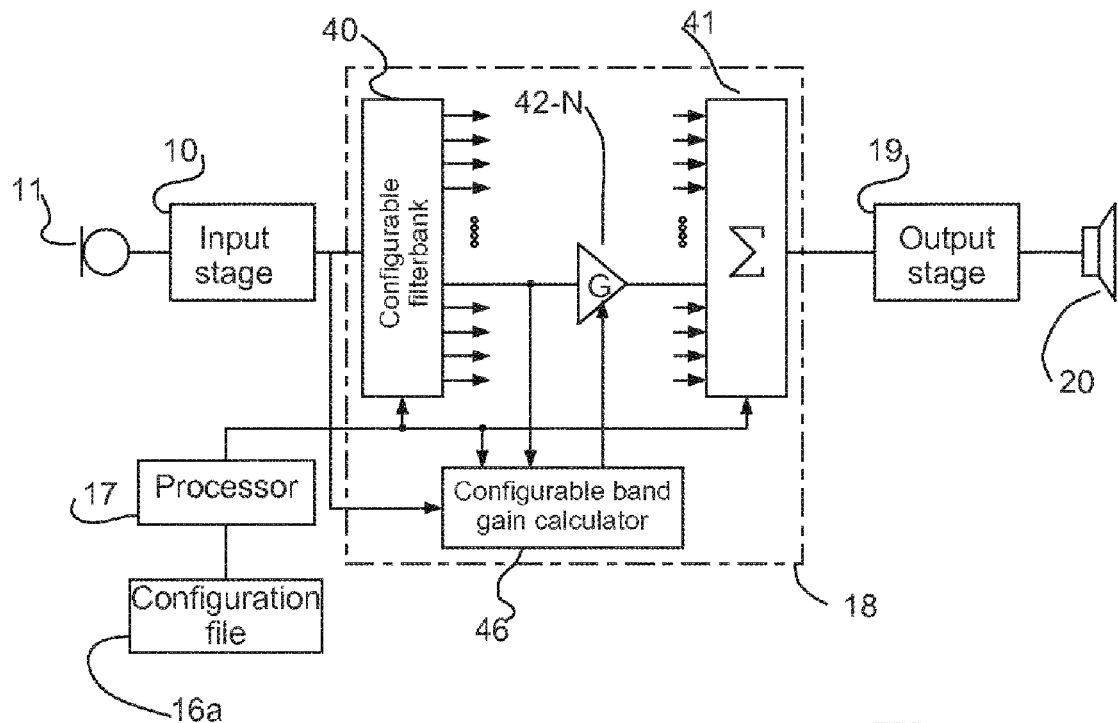
FIG. 5 illustrates in details a hearing aid according to one embodiment of the invention.

FIG. 5 illustrates in details a hearing aid 1 according to one embodiment of the invention. As with reference to FIG. 1, the hearing aid 1 comprises at least one input transducer or microphone 11 for picking up an acoustic sound and converting it into electric signals delivered to the configurable Digital Signal Processor 18 via the input stage 10. The conditioned signal from configurable Digital Signal Processor 18 is, via a digital output stage 19 amplifying the conditioned signal, output to a speaker or output transducer 20.

The processor 17 controls the configurable Digital Signal Processor 18 and wireless communication unit 21 (not shown in this figure). The hearing aid 1 does also include a power supply and user interface even though these elements have been left out in the figure. When booting, the processor 17 reads the configuration file 16a from the memory 16 and configures the configurable Digital Signal Processor 18 accordingly.

The configurable Digital Signal Processor 18 receives a broadband digital audio signal from the analog input stage 10 and has in the illustrated embodiment a configurable filterbank 40 splitting the broadband audio signal into a plurality of narrow frequency bands N in which the signal processing takes place.

A configurable band gain calculator 46 basically applies a frequency dependent momentary gain to the narrowband signal by respective amplifiers 42-N. The momentary gain is dependent on the hearing aid compensation profile set in order to alleviate the hearing loss of the hearing aid user and stored memory 18a, and a compressor characteristic defined by the static and dynamic features of a compressor integrated as a part of the configurable Digital Signal Processor 18. Static features, including the compression threshold and the compression ratio, indicate how the Digital Signal Processor 18 responds to steady input signals (e.g., a running vacuum cleaner or background noise in a restaurant). Dynamic features, such as attack time and release time, describe how the Digital Signal Processor 18 responds to a changing input signal (e.g., speech in a one-to-one conversation or shocks/transients).

These parameters are preferably also stored in the memory 18a. The configurable band gain calculator 46 receives the broadband audio signal and the narrow band audio signal from each of the frequency bands in order to detect the present sound environment and detect acoustic shocks, and controls the momentary gain in each of the frequency bands accordingly.

The multiple narrowband signals are combined in a summing unit 41 into a broadband digital audio signal delivered to the output stage 19. The processor 17 shapes the configurable Digital Signal Processor 18 according to the configuration file 16a and according to the teaching in "*A Reconfigurable Digital Filterbank for Hearing-Aid Systems with a Variety of Sound Wave Decomposition Plans*", by Ying Wei et al in Biomedical Engineering, IEEE Transactions on (Volume: 60, Issue: 6). A reconfigurable filterbank consisting of a multiband-generation block (configurable filterbank 40) and a subband-selection block (summing unit 41) is taught in this paper.

Figure 6:
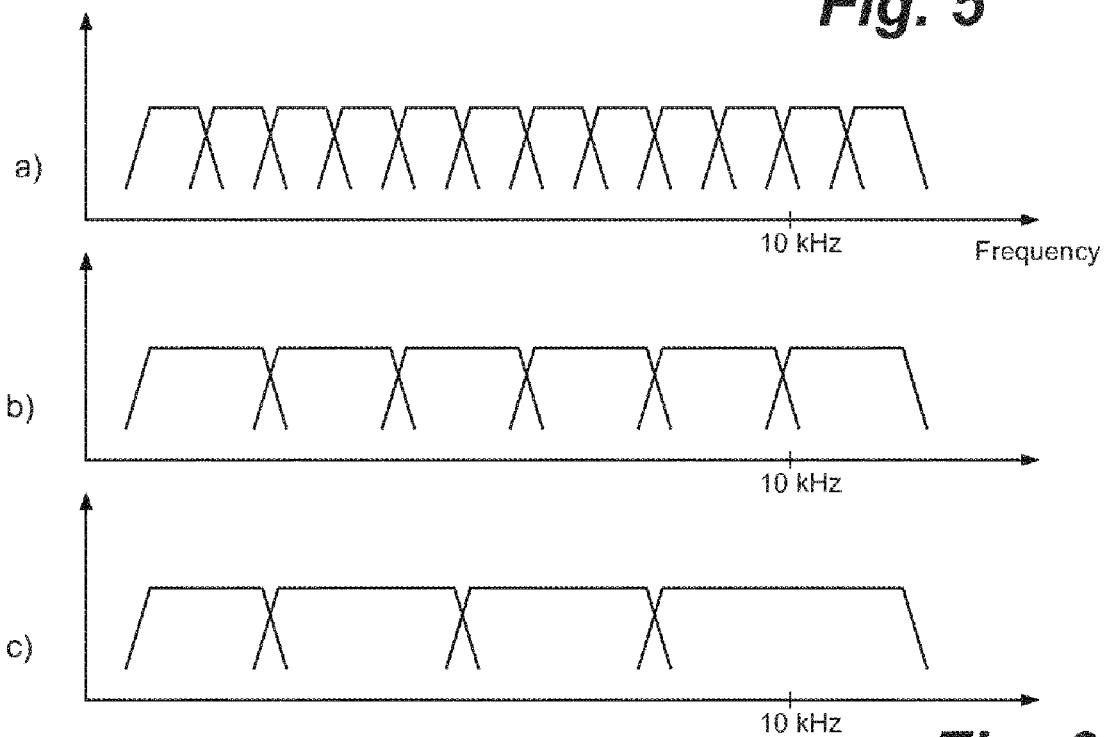
FIG. 6 illustrates a filter bank for of a configurable digital signal processor according to the embodiment of the invention shown in FIG. 5.

FIG. 6 illustrates how the processor 17 in this embodiment switches configurable Digital Signal Processor 18 between three different modes. The configurable filterbank 40 comprises twelve bandpass filters splitting the incoming signal into twelve sub-bands in which the signal processing takes place prior to the combination in the summing unit 41 into one output signal. The twelve bandpass filters have individually adjustable bandwidths and center frequencies. For some uses it is advantageous to ensure that each bandpass filter covers an octave in the frequency domain. If special attention is paid to certain frequencies ranges, the configurable filterbank 40 may split octaves containing those certain frequencies range into multiple bands.

In the first mode shown in FIG. 6, graph a), the configurable filterbank 40 has twelve bandpass filters providing twelve sub-bands for signal processing together covering the audible part of the frequency range. When applying twelve bandpass filters in the filterbank, the average bandwidth of each bandpass filter will be just below one octave.

In the second mode shown in FIG. 6, graph b), the configurable Digital Signal Processor 18 has six sub-bands for signal processing which together cover the audible part of the frequency range. However, the configurable filterbank

40 still has twelve bandpass filters providing twelve sub-bands, but six of these are configured to cover the audible part of the frequency range. The remaining six sub-bands are decimated by the summing unit 41 and not included in the synthesis process for reconstitution of a complete signal resulting from the filtering process. Advantageously, the configurable band gain calculator 46 will save power by avoiding calculating the gain for the decimated sub-bands. The bandwidths and center frequencies for the six decimated sub-bands can be set arbitrarily as the outputs from these sub-bands are not used in the synthesis process for reconstitution of a complete signal.

In the third mode shown in FIG. 6, graph c), the configurable Digital Signal Processor 18 has only four sub-bands for signal processing which together cover the audible part of the frequency range. Also in this embodiment, the configurable filterbank 40 still has twelve bandpass filters providing twelve sub-bands, but only four of these are configured to cover the audible part of the frequency range. The remaining eight sub-bands are decimated by the summing unit 41 and not included in the synthesis process for reconstitution of a complete signal resulting from the filtering process, whereby the bandwidths and center frequencies for the eight decimated sub-bands can be set arbitrarily.

By setting the bandwidths and center frequencies of sub-bands used in the signal processing to cover the audible part of the frequency range, and by decimating the output from sub-bands not contributing to the reconstitution of a complete signal resulting from the filtering process, signal processing of the hearing aid according to the invention can be configured in various modes by means of configuration instructions received from a remote server when using the dynamic, configurable filterbank 40 and the dynamic summing unit 41.

Figure 7:
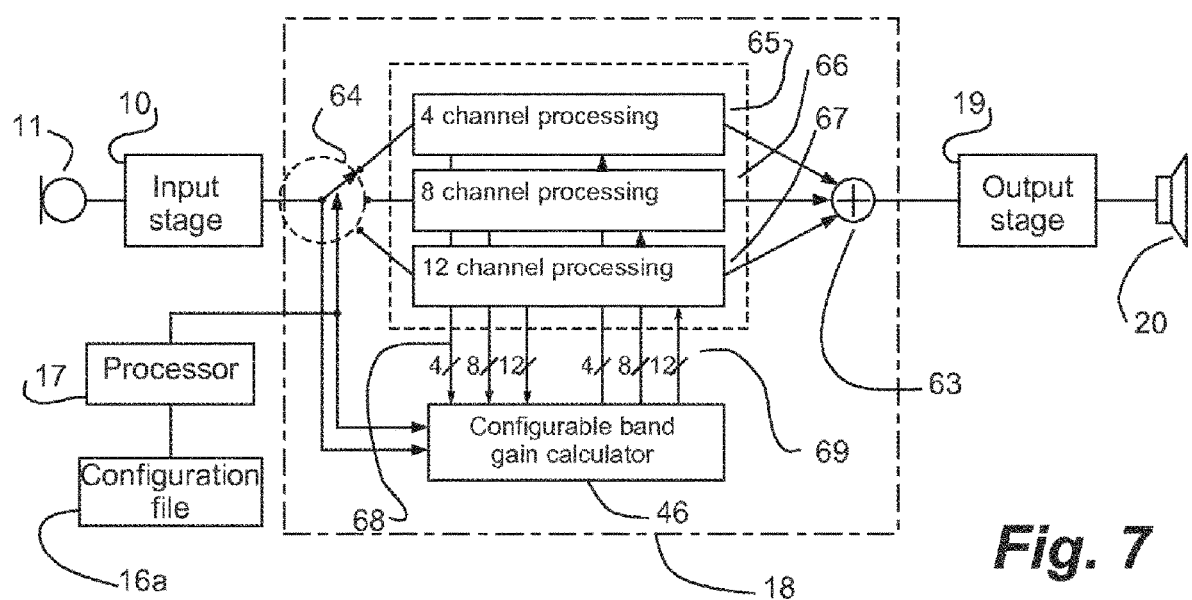
FIG. 7 illustrates in details a hearing aid according to one further embodiment of the invention.

FIG. 7 illustrates in details a hearing aid 1 according to one further embodiment of the invention. The hearing aid 1 comprises at least one input transducer 11 for picking up an acoustic sound and converting it into electric signals delivered to the configurable Digital Signal Processor 18 via the input stage 10. The conditioned signal from configurable Digital Signal Processor 18 is via a digital output stage 19 amplifying the conditioned signal output to a speaker or output transducer 20. The processor 17 controls the configurable Digital Signal Processor 18 and wireless communication unit 21 (not shown in FIG. 7). When booting, the processor 17 reads the configuration file 16a from the memory 16 and configures the configurable Digital Signal Processor 18 accordingly.

The configurable Digital Signal Processor 18 receives a broadband digital audio signal from the analog input stage 10 and has in the illustrated embodiment three static filterbank elements 65, 66 and 67 in parallel. The three static filterbank elements 65, 66 and 67 splits the broadband audio signal into four, eight and twelve narrow frequency bands, respectively. A switch 64 is controlled by the processor 17 according to the configuration of the hearing aid 1, and directs the broadband audio signal into the selected static filterbank element—here the filterbank element 65 having four sub-bands for signal processing.

The configurable band gain calculator 46 is also controlled by the processor 17 according to the configuration of the hearing aid 1. The momentary gain is calculated from the hearing aid compensation profile and the compressor characteristic. The configurable band gain calculator 46 controlled by the processor 17 receives the broadband audio signal and the narrowband signals 68 from each of the sub-bands in the selected static filterbank element 65, and it delivers a frequency dependent momentary gain 69 to the narrowband signal by respective amplifiers in the sub-band of the selected static filterbank element 65. The multiple narrowband signals are subsequently combined into a broadband digital audio signal prior to leaving the selected static filterbank element 65 and being delivered to the output stage 19. A further summing point 63 sums the output from the three static filterbank elements 65, 66 and 67. In practice, the summing point 63 just allows the output from the selected filterbank element 65 to pass through, as the non-selected filterbank elements 66 and 67 do not receive an input due to the switch 64, and as the configurable band gain calculator 46 will not apply a gain to the sub-bands of the non-selected filterbank elements 66 and 67 due to the switch 64.

Figure 8:
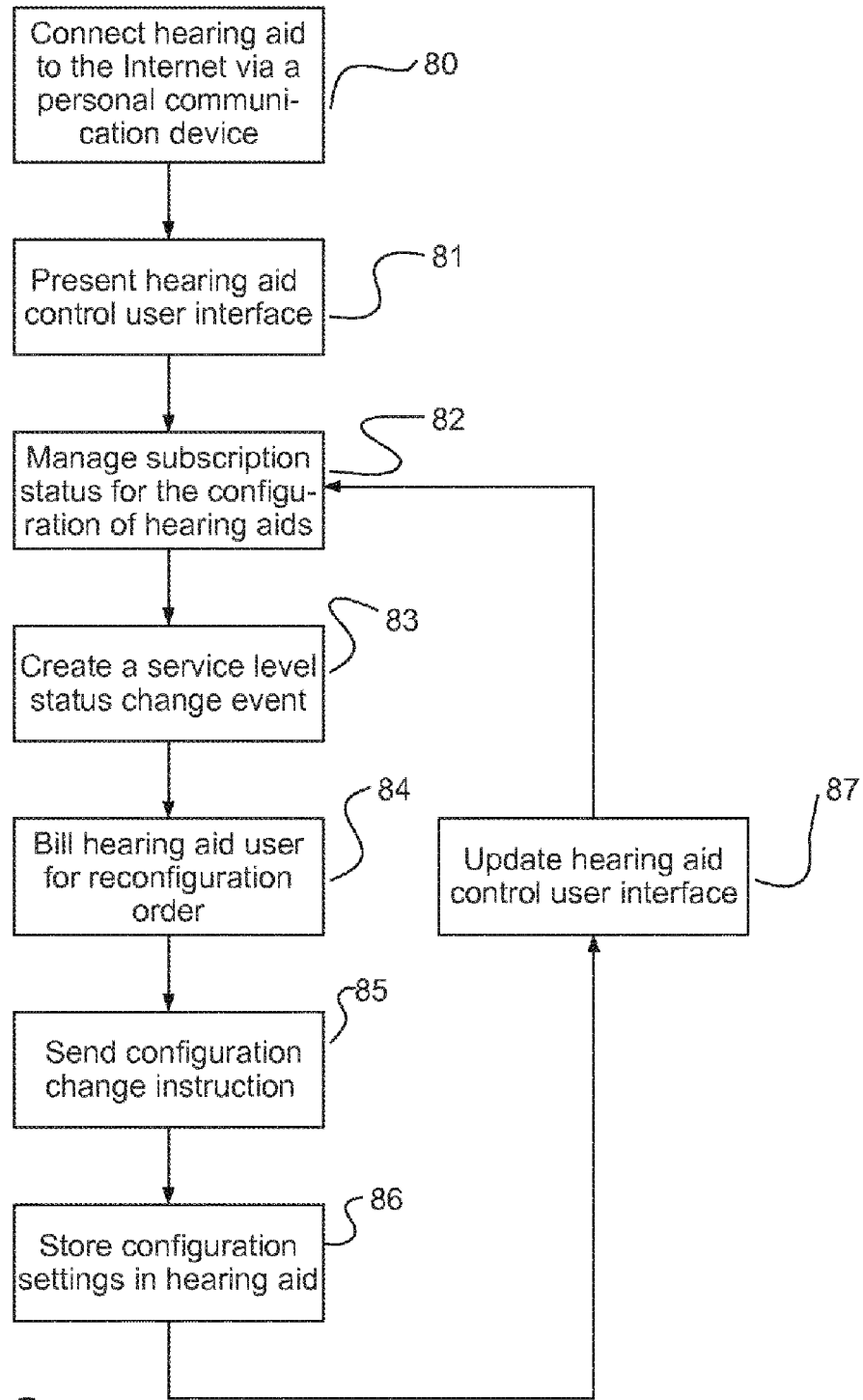
FIG. 8 is a flow chart illustrating an embodiment of the method according to the invention for managing a customizable configuration in a hearing aid.

FIG. 8 is a flow chart illustrating an embodiment of the method according to the invention for managing a customizable configuration in a hearing aid 1. The method may be carried out with the hearing aid configuration management system shown in FIG. 2. The user account management server 37 manages user accounts for a plurality of hearing aid users—including subscription status for the configuration of the at least one hearing aid 1. The hearing aid 1 has a transceiver for establishing a wireless connection to an Internet enabled personal communication device 30 which becomes a gateway to a user account management server 37 accessible over the Internet 35 for the hearing aid 1, re step 80. Once the pairing has taken place, the app of the Internet enabled personal communication device 30 (e.g. a smartphone) presents a hearing aid control user interface for the hearing user, re step 81. The user account management server 37 manages subscription status for the configuration of the hearing aid 1 in step 82, which is possible when the hearing aids are connected to the Internet via Internet enabled personal communication device 30.

The hearing aid 1 includes a processor 17 controlling the configuration of the hearing aid 1, and a memory 16 containing configuration settings for customizing the configuration of the hearing aid 1.

In case the user intends to upgrade his hearing aids 1 according to the invention, e.g. from a basic service level to an enhanced service level, the user accesses his account 50 via a web interface and by indicating that he would like to upgrade his hearing aids 1 by accepting a potential configuration, and the user account management server 37 creates in step 83 a service level status change event for the account upon change of the service level status to a new configuration of the at least one hearing aid 1. This service level status change event may be caused by a desire from the user to upgrade his set of hearing aids 1 from e.g. four frequency processing bands to eight or even twelve frequency processing bands.

A hearing loss will normally be frequency dependent, as a hearing impaired person often will experience the most significant hearing loss at the highest frequencies. Therefore, the digital signal processor 18 divides the signal processing into a plurality of frequency bands. The gain applied to the audio signal is regulated separately each of these frequency bands. Into a certain degree, it is valid that the finer the frequency division (higher number of frequency bands), the more flexibility there is to match a particular hearing loss curve.

Due to the service level status change event in step 83, the user account management server 37 invoices in step 84 automatically the hearing aid user for the reconfiguration order. The order is regarded as a purchase order and the invoicing takes place as specified in the accounting data field 53 of the user account 50. The purchase order may require a one-time payment or may be a part of a hearing aid service subscription, and therefor require periodical payments. Furthermore, the user account management server 37 sends in step 85 a configuration change instruction to the hearing aid 1 using the personal communication device 30 as gateway. The configuration change instruction sent to the hearing aid 1 may include a configuration file, and when the hearing aid 1 receives the configuration file the processor 17 verifies the validity of configuration file by checking that the user account management server 37 is permitted to edit the configuration file according to data management certificates stored in the hearing aid memory 16, and that the format configuration file has not been corrupted. Once the validity of the received certificate has been verified, the processor 17 of the hearing aid 1 stores in step 86 the new configuration settings or the configuration file 16*a* in the hearing aid memory 16.

The Internet enabled personal communication device 30 presents an app with the hearing aid control user interface for the hearing user, and if the reconfiguration of the hearing aid 1 calls an amended user interface, the user account management server 37 pushes an updated user interface, e.g. with additional control elements, to the personal communication device 30 as a part of the service level status change event in step 87. When the actions caused by the service level status change event have been successfully completed, the user account management server 37 continues managing the user accounts until a new service level status change event is detected.

In case the service level change includes enhancing a basic service level (e.g. four audio processing bands) to an enhanced service level (e.g. eight or twelve audio processing bands) for a subscription period managed via the account on the user account management server 37, the expiration of the subscription period will automatically create a new service level status change event. Here the hearing aid user will be invited to pay for a renewal of the enhanced subscription. However, if the hearing aid user only pays for the basic subscription, a service level status change event created in the user account management server 37 will start changing the customized configuration of the hearing aid 1 back to the configuration associated with the basic service level by sending a configuration change instruction to the at least one hearing aid 1 using the personal communication device 30 as gateway.

The user account management server 37 will be able to set up a secure connection to the hearing aids 1 for pushing a configuration file or elements thereof to the hearing aids 1. The trigger for doing such a push may be that the user has requested an amended hearing aid configuration, and this may require an additional one-time payment or an additional periodic subscription fee. The user may also receive one or more replacement hearing aids 1 directly from factory, which new hearing aids 1 will need to be configured in a similar way as the ones they are replacing. This will make a replacement operation easier for the client as the new hearing aids 1 can be delivered by a postal or shipping company and the preparation and personalization of the hearing aids 1 takes place online using a personal communication device 30 as gateway.

The invention claimed is:

1. A hearing aid configuration managing system comprising at least one hearing aid having a wireless connection via the Internet;
   wherein the at least one hearing aid includes:
      a digital signal processor including a first memory, the digital signal processor being adapted for alleviating a hearing loss of a hearing aid user based on settings stored in the first memory,
      a hearing aid processor controlling the configuration of the hearing aid, and
      a second memory containing configuration settings for customizing the configuration of the at least one hearing aid;
   wherein a remote server is adapted for:
      managing user accounts for a plurality of hearing aid users, including managing the configuration of the at least one hearing aid;
      creating a service level status change event for the account upon change of the service level status to a new configuration of the at least one hearing aid; and
      sending a configuration change instruction with new configuration settings to the at least one hearing aid upon the occurrence of the service level status change event,
      wherein said hearing aid comprises an arrangement of functional units and the new configuration settings are adapted to provide a new configuration of the at least one hearing aid by changing at least one of the number, type or interconnection of said functional elements, by performing at least one of the following actions:
         configuring a filter bank,
         activating elements embedded in the digital signal processor,
         activating sensor elements,
         activating additional microphones; and
   wherein the hearing aid processor is adapted for:
      storing the new configuration settings in the second hearing aid memory, and
      changing the configuration of the hearing aid to a new arrangement of functional units in accordance with the new configuration settings upon reception of the configuration change instruction and based on the new configuration settings stored in the second memory.

2. The system according to claim 1, wherein the at least one hearing aid is connected to the Internet via a gateway provided by an Internet enabled personal communication device.

3. The system according to claim 2, wherein the personal communication device is adapted to present a hearing aid control application software interface to the user.

4. The system according to claim 1, wherein the remote server, upon reception of a hearing aid user generated order to customize the configuration of the at least one hearing aid, is adapted to invoice the hearing aid user for the order based upon invoicing information stored in the account.

5. The system according to claim 4, wherein the remote server, upon reception of the order to customize the configuration of the at least one hearing aid, is adapted to update control elements of the hearing aid control application software interface.

6. The system according to claim 1, wherein the service level change enhancing a basic service level to an enhanced service level is available for a subscription period managed via the account on the remote server.

7. The system according to claim 6, wherein the remote server, upon expiration of the subscription period, automatically creates a service level status change event for changing the customized configuration of the at least one hearing aid back to the configuration associated with the basic service level, and sends a configuration change instruction to the at least one hearing aid, utilizing the personal communication device as gateway.

8. The system according to claim 1, wherein changing the configuration of said hearing aid comprises changing at least one of the number, type or interconnection of said functional units.

9. A configurable hearing aid comprising
a digital signal processor adapted for alleviating a hearing loss of a hearing aid user based on settings stored in a first memory in said hearing aid,
a hearing aid processor;
a transceiver for establishing a wireless connection via a gateway to a remote server accessible over the Internet;
a second memory containing configuration settings for customizing the configuration for the hearing aid, said configuration settings pertaining to at least one of a choice of filter bank configuration, activation of elements embedded into the digital signal processor, activation of sensor elements or activation of additional microphones;
wherein the hearing aid processor is adapted for:
receiving a configuration change instruction with new configuration settings sent from a remote server;
extracting the new configuration settings from the configuration change instruction;
storing the new configuration settings in the second memory; and
configuring the hearing aid by using the new configuration settings stored in the second memory,
wherein said hearing aid comprises an arrangement of functional units and said step of changing the hearing aid comprises changing to a new arrangement of functional units.

10. The hearing aid according to claim 9, and having a basic configuration associated with a basic service level and one or more advanced configurations associated with one or more enhanced service levels, wherein the one or more advanced configurations can be activated by configuration change instructions received from the remote server.

11. The hearing aid according to claim 10, wherein the one or more enhanced service levels are available for a subscription period managed via the account on the remote server.

12. The hearing aid according to claim 9, wherein the hearing aid processor controls the configuration of the hearing aid by changing an arrangement of functional units of said digital signal processor.

13. The hearing aid according to claim 9, wherein the new configuration settings are contained in a configuration file, and the configuration file is stored in a non-volatile memory from where the processor retrieves configuration data when starting up or booting.

14. The hearing aid according to claim 13, wherein the configuration file changes an arrangement of various hardware items in the signal processing path of the hearing aid.

15. The hearing aid according to claim 14, wherein the Digital Signal Processor is adapted for receiving a broadband digital audio signal from an analog input stage of the hearing aid and comprises a configurable filter-bank splitting the broadband audio signal into a plurality of narrow frequency bands for signal processing.

16. A method for configuring at least one hearing aid having a wireless connection for communicating via the Internet with a remote server managing user accounts for a plurality of hearing aid users, wherein the hearing aid includes a digital signal processor adapted for alleviating a hearing loss of a hearing aid user based on settings stored in a first memory in the hearing aid, a hearing aid processor, and a second memory containing configuration settings for configuring the at least one hearing aid, wherein the method comprises the steps of:
managing, in the remote server, a subscription status for the configuration of the at least one hearing aid;
creating, in the remote server, a service level status change event for the account upon change of the service level status to a new configuration of the at least one hearing aid;
sending a configuration change instruction with new configuration settings to the hearing aid upon the occurrence of the service level status change;
storing the new configuration settings in the second memory; and
configuring the hearing aid by using the new configuration settings stored in the second memory, wherein said hearing aid comprises an arrangement of functional units and said new configuration settings correspond to a change in at least one of the number, type or interconnection of said functional units and pertain to at least one of a choice of filter bank configuration, activation of elements embedded into the digital signal processor, activation of sensor elements and additional microphones.

17. The method according to claim 16, wherein an Internet enabled personal communication device and the at least one hearing aid are provided with respective transceivers for establishing a wireless connection, whereby the personal communication device becomes a gateway for the at least one hearing aid to a remote server accessible over the Internet, and comprising the step of presenting a hearing aid control application software interface to the user on the personal communication device.

18. The method according to claim 16, comprising invoicing, in the remote server, the hearing aid user for the order based upon invoicing information stored in the account, upon reception of a hearing aid user generated order to customize the configuration of the at least one hearing aid.

19. The method according to claim 17, comprising updating, from the remote server, the hearing aid control application software interface with additional control elements on the personal communication device, upon reception of the order to customize the configuration of the at least one hearing aid.

20. The method according to claim 16, wherein the service level change comprises enhancing a basic service level to an enhanced service level for a subscription period managed via the account on the remote server.

21. The method according to claim 16, and further comprising steps of:
automatically creating a service level status change event for changing the customized configuration of the at least one hearing aid back to the configuration associated with the basic service level, upon expiration of the subscription period; and
sending a configuration change instruction to the at least one hearing aid.

* * * * *